United States Patent [19]

King

[11] 4,042,501

[45] Aug. 16, 1977

[54] PURIFICATION OF IRON CONTAINING ACIDIC SOLUTIONS

[75] Inventor: William R. King, San Carlos, Calif.

[73] Assignee: Kaiser Aluminum & Chemical Corporation, Oakland, Calif.

[21] Appl. No.: 702,301

[22] Filed: July 2, 1976

[51] Int. Cl.$^2$ .............................................. C02C 5/02
[52] U.S. Cl. ...................................... 210/51; 210/56; 423/140; 423/633
[58] Field of Search ....................... 55/85, 89; 134/13; 210/24, 38 B, 42, 45, 47, 50–53, 56, 21; 423/132, 140, 633

[56] References Cited

U.S. PATENT DOCUMENTS

| | | | |
|---|---|---|---|
| 2,176,610 | 10/1939 | Stamberg | 423/68 |
| 2,388,659 | 11/1945 | Ryan et al. | 423/633 |
| 2,643,204 | 6/1953 | Mancke | 134/13 |
| 2,650,931 | 9/1953 | Dron et al. | 210/21 |
| 2,842,436 | 7/1958 | Dasher et al. | 423/140 |
| 3,043,771 | 7/1962 | Bloch | 210/24 R |
| 3,788,982 | 1/1974 | Zsoldos et al. | 210/38 B |

*Primary Examiner*—Thomas G. Wyse
*Assistant Examiner*—Peter A. Hruskoci
*Attorney, Agent, or Firm*—Paul E. Calrow; Andrew E. Barlay

[57] ABSTRACT

Iron containing aqueous, acidic solutions, such as acidic stripping solutions used to remove iron from organic extractants, are purified by subjecting the acidic solution to a hydrothermal treatment at elevated temperatures and pressures which cause the precipitation of the dissolved iron in easily separable form. The hydrothermal treatment is accomplished at temperatures in excess of about 100° C. The process can be applied to acidic solutions containing the dissolved iron in the form of ferric sulfate, ferric nitrate or chloride and is particularly adaptable to acidic stripping solutions resulting from the purification of organic extractants employed to extract iron impurities from solutions obtained in the acid leaching of clays, ores and concentrates.

5 Claims, No Drawings

PURIFICATION OF IRON CONTAINING ACIDIC SOLUTIONS

BACKGROUND OF THE INVENTION

Recovery of metal values from clays, ores and concentrates by acid leaching has widespread use. The acid leaching of these materials generally results in an acidic solution containing the metal to be recovered together with acid-soluble metallic impurities, mainly iron. Unless these acid-soluble metallic impurities are separated from the desired metal, the final product will be contaminated and unsatisfactory for its intended use. A common method employed for the removal of dissolved iron impurities from aqueous, acidic leach solutions is the use of an organic extractant which selectively extracts from the leach solution the iron impurity, usually in the form of a complex. In order to allow the recycle of the organic extractant for further purification purposes the iron impurity containing organic phase is generally stripped with an aqueous acidic solution. Stripping will destroy the complex and the iron impurity will then be dissolved in the acidic stripping solution. In commercial scale operations large volumes of acidic stripping solutions are generated and the disposal of these solutions presents a problem from both an environmental point of view and from a purely technical and economical standpoint. Due to its acidity the solution cannot be directly disposed of into natural receiving bodies, neutralization is costly and it may generate further problems for example disposal of solid waste.

It has already been suggested to remove the dissolved metal salts from the stripping solutions by crystallization and subsequent separation of the crystallized salt from the residual liquor. Crystallization involves extended time periods and/or requires large pond areas to provide the required surface, particularly in view of the large volumes involved. Acceleration of the crystallization process by using evaporation at elevated temperatures requires significant external energy and care, for example in case of hydrochloric or nitric acid solutions, pose additional problems, such as generation of environmentally undesirable acid fumes.

It has now been discovered that the iron salt content of iron-containing acidic stripping solutions can be readily removed in the form of solid iron oxide without requiring neutralization and encountering environmental problems by hydrothermally treating the acidic solution at elevated temperatures and pressures. This treatment causes the conversion of dissolved iron sulfate, nitrate or chloride to solid iron oxide which can be separated from the residual liquor. The residual, substantially iron-free acid solution can be, if desired, recycled to the stripping of iron salt laden organic extractants.

SUMMARY OF THE INVENTION

A process for removing dissolved iron salts from aqueous, acidic stripping solutions resulting from the stripping of organic, iron-laden extractants with an aqueous acid solution which comprises subjecting the dissolved iron salt containing acidic solution in which the iron salt is present as ferric sulfate, ferric nitrate or ferric chloride, to a hydrothermal treatment at a temperature in excess of about 100° C for a time period sufficient to convert a significant quantity of the dissolved iron salt to the acid insoluble iron oxide form, followed by separation of the solid iron oxide from the residual solution and recovery of an acidic solution if depleted in dissolved iron content.

DETAILED DESCRIPTION OF THE INVENTION

This invention relates to the removal of dissolved iron salts from aqueous, acidic solutions More particularly, it concerns the hydrothermal treatment of dissolved iron salt-containing acidic solutions such as used for the stripping of the iron content of organic water-immiscible extractants which are commonly employed for the purification of acidic leach solutions.

In the hydrometallurgical recovery of important metal values from clays, ores and concentrates, it is well known to employ a mineral acid for leaching. The leaching treatment results in an acidic solution and acid-insoluble residue. The acidic solution in most instances contains besides the metal to be recovered other acid-soluble metallic impurities which can interfere with the recovery of the desired metal from the leach solution. Consequently, methods have been developed to remove the undesired metal impurities from acidic leach solutions prior to further processing the leach solution. One of the most widely employed methods, which is used for the selective removal of metallic impurities from acidic leach solutions, involves extraction of these impurities with a liquid or solid water-insoluble or immiscible organic extracant. The extraction results in an organic phase in which the extracted metallic impurity is generally in a complex salt form and an aqueous phase which has been depleted in impurities and which can be employed after separation from the organic phase, for the recovery of its desired metal content. Due to the large volumes of acidic leach solutions to be purified, the quantity of organic extractant to be employed is considerable. Thus, for economical reasons the metallic salt content of organic extractants is generally removed by stripping it with an aqueous, acidic medium which allows the recycle of the stripped, organic extractant for renewed purification of contaminated acidic leach solutions. Stripping of the organic extractant with an acidic solution results in large volumes of aqueous acid solutions containing dissolved therein the metallic impurity content of the extractant. The purpose of the present invention is to provide an efficient method for removing the dissolved metal content of this acidic stripping solution, thus allowing the reuse of the purified acid solution for renewed stripping.

The instant process is specifically directed to the removal of dissolved iron impurities from acidic stripping solutions since iron is one of the main contaminating metals in such stripping solutions. For example, it can be seen from Table I that lateritic ores such as used for the hydrometallurgical recovery of nickel and/or cobalt by acid leaching of the ore, contain iron, as one of the major acid-soluble metallic impurity. The same is true for other alumina-containing ores, for example anorthosite, as shown in Table I. Consequently, the removal of the dissolved iron-content of acidic stripping solutions is of primary importance.

For the purpose of the present invention the term "organic extractant" includes the customarily employed organic solvents and ion exchange resins which are capable of selectively removing dissolved iron impurities from aqueous, acidic leach solutions containing iron as a contaminant. Typical organic extractants used for this purpose are well-known and no attempt is going to be made to list these herein, since for the purposes of the instant process the type and nature of these extractants is immaterial.

It is also of common knowledge to utilize mineral acids, such as sulfuric, nitric and hydrochloric acids, in their aqueous solution to remove the dissolved iron content from the organic extractants. Generally, the acidic stripping solutions employed for this purpose are strongly acidic, i.e., the pH of these acid solutions is usually in the neighborhood of about 2-3 or less. Acid concentration, i.e. solutions having a pH of about 3 or more, can also be employed for stripping, however, at these lower acid concentrations, the removal of the iron content of the organic extractant is less efficient.

In order to accomplish the purpose of the instant invention, i.e., the removal of dissolved iron impurities from the acidic stripping solutions, the dissolved iron in these solutions should be in the trivalent form, that is it should preferably be present in the form of $Fe_2(SO_4)_3$, $Fe(NO_3)_3$ or $FeCl_3$. If there are any divalent Fe ions ($Fe^{++}$) present in the acidic stripping solutions, these may be converted to the trivalent form prior to subjecting the stripping solution to the hydrothermal treatment of the invention. Oxidation of $Fe^{++}$ to $Fe^{+++}$ if needed, can be accomplished by known oxidizers, for example by addition of $Cl_2$ to the acidic stripping solution.

The hydrothermal treatment of the instant process involves heating of the dissolved iron-containing acidic solutions in a closed vessel, at elevated temperatures generally at temperatures in excess of about 100° C, preferably at temperatures above about 150° C. The pressures employed in the treatment are generally the vapor pressures generated by the acidic solution being tested, however, if desired pressures higher than the generated vapor pressure can also be employed.

The time required for the hydrothermal treatment depends on the temperatures employed and also on the free acid concentration of the stripping solution subjected to the treatment. In general, it has been found that significant conversion of dissolved iron salts to solid $Fe_2O_3$ precipitate can be achieved in less than about 1 hour at temperatures within the range of about 150° and 250° C in solutions having free acid concentrations of about 0.05-0.1 normality. It has been further found that as the free acid concentration of the solution increases the time required to convert the acid soluble iron compound to the insoluble oxide increases. For the purposes of this invention the expressions "significant conversion" and "significant quantity" denote at least about a 50% conversion of the dissolved iron salt to acid insoluble iron oxide under the hydrothermal treatment conditions of the instant process.

It has been found that upon using the same temperature and pressure conditions for the same time period at corresponding $Fe^{3+}$ and free acid concentrations, the degree of dissolved iron salt conversion to insoluble iron oxide varies in the following order: $Fe(NO_3)_3 > Fe_2(SO_4)_3 > FeCl_3$, meaning that under the same treatment conditions more $Fe(NO_3)_3$ converts to $Fe_2O_3$ than from $Fe_2(SO_4)_3$. Table II shows the comparative conversion percentages of these iron salts under the same treatment conditions.

Surprisingly it has also been discovered that by addition of an aluminous compound to the acidic stripping solution the percentage of $Fe_2(SO_4)_3$ and $FeCl_3$ converted to insoluble $Fe_2O_3$ can be significantly increased. Suitable aluminous compounds which cause this effect are those which are capable of dissolving in an acid solution having a pH less than about 2. Representative aluminous compounds which can be utilized for this purpose include gibbsite ($Al_2O_3.3H_2O$) boehmite ($Al_2O_3.H_2O$) and other hydrated aluminas having the formula of $Al_2O_3.x\ H_2O$), where $x$ is 0.01 to 3.0. This feature of the invention becomes particularly important in case alumina is to be recovered by acid leaching of clays, ores or similar materials, for example low grade bauxite ores. In these instances the acidic solution, resulting from the stripping of the organic extractant, can be readily doped with the aluminous compound, since after the conversion of the soluble iron salt to insoluble $Fe_2O_3$ by the hydrothermal treatment of the instant process and separation of the produced solids, the purified solution containing dissolved alumina values can be combined with the acidic leach solution from which the iron impurity has already been removed by extraction with an organic extractant. From the combined, iron-free acidic leach solutions the alumina content can then be readily recovered by for example crystallization to form an aluminum salt, which is then thermally converted to alumina and can also be used for doping.

The quantity of alumina to be added to the acidic stripping solution is generally selected to be at least about 20% of the stoichiometric quantity which the total acid content of the solution (free acid + liberated acid) is capable of dissolving. Preferably, the quantity of alumina added is within the range of about 20% of the stoichiometric to about the stoichiometric quantity capable of being dissolved by the acid content of the solution. The quantity of alumina is thus controlled by this consideration, since in most instances precipitation of pure $Fe_2O_3$ is desired rather than the production of a mixture of $Fe_2O_3$ and $Al_2O_3$. Nevertheless, where the emphasis is on the total conversion of the soluble iron salt content to insoluble $Fe_2O_3$, higher than stoichiometric quantities (relative to the total acid content) can also be added.

The hydrothermal conversion of the instant process results in a readily filterable $Fe_2O_3$. Any trace amount of suspended $Fe_2O_3$ can be settled if desired by addition of small quantities of flocculant. The produced $Fe_2O_3$, after separation from the acidic medium, can be washed and dried and the dry product due to its high purity and uniform particle size, can be utilized for many purposes where such properties are desired, for example for pigmentation.

The purified stripping solution, depending whether or not it has been doped with alumina, can be either recycled for renewed stripping or combined, as mentioned above, with the ironfree acidic leach solution.

The following examples will further illustrate the novel aspects of the invention.

EXAMPLE 1

An aqueous sulfuric acid solution, resulting from the stripping of an organic, iron-impurity containing extractant, was subjected to the hydrothermal treatment of the instant invention The acid solution contained 13.77 g/kg dissolved $Fe^{3+}$ and 0.008 g/kg free $H_2SO_4$ expressed as $H^+$. From this solution 20g were heated to 200° C in 15 minutes in a closed tantalum bomb and then the solution was kept at this temperature for 30 minutes. Subsequently, the bomb was cooled to room temperature and the precipitated $Fe_2O_3$ was separated from the liquor. The hydrothermal treatment resulted in the conversion of 76.8% of the dissolved $Fe_2(SO_4)_3$ content to insoluble $Fe_2O_3$. The liquor, significantly depleted in $Fe^{3+}$ content was suitable for recycle to the stripping step.

EXAMPLE II

The above experiment was repeated with an aqueous $HNO_3$ solution resulting from the stripping of an iron-containing organic extractant. The nitric acid solution contained 13.77 g/kg dissolved $Fe^{3+}$ and its free acid content was 0.008 g/kg expressed as $H^+$. The hydrothermal treatment, under the conditions described in Example I, resulted in the conversion of 98.4% of the dissolved iron content to insoluble iron oxide.

EXAMPLE III

A hydrochloric acid stripping solution containing 39.10 g/kg dissolved $FeCl_3$ and 0.3 g/kg free HCl was heated to 200° C in 15 minutes in a closed tantalum bomb, then kept at this temperature for 30 minutes. After cooling to room temperature, the solid $Fe_2O_3$, corresponding to a 52.6% conversion of soluble $Fe^{3+}$ to insoluble $Fe_2O_3$, was separated from the liquor.

The experiment was repeated, this time however 0.3112g $Al_2O_3.3H_2O$ was also incorporated in the stripping solution prior to the hydrothermal treatment. The addition of alumina resulted in an 86.1% conversion of soluble $FeCl_3$ to $Fe_2O_3$. After separation of the solid $Fe_2O_3$, the residual liquor containing dissolved $AlCl_3$ was recycled to the $AlCl_3$ containing leach solution, obtained by the leaching of Georgia clay with hydrochloric acid, for the recovery of its $AlCl_3$ content by conventional means.

The results of the above Examples clearly indicate the efficient and economic nature of the instant invention without however intending to limit the scope thereto.

TABLE I

| Composition Weight % | Lateritic[1] Ore | Clay[2] | Anorthosite[3] |
|---|---|---|---|
| Ni | 0.92 | not detmd | not detmd |
| Co | 0.12 | not detmd | not detmd |
| Fe | 40.0 | 0.65 | 1.87 |
| Al | 1.6 | 8.25 | 14.21 |
| Mg | 0.4 | 0.13 | not detmd |
| $SiO_2$ | not detmd | 62.1 | 52.9 |
| CaO | not detmd | 0.20 | 10.75 |
| $H_2O$ | 32.0 | 1.03 | 1.76 |

[1] New Caledonia Oxidic laterite (as is basis).
[2] North Carolina surface clay (dry basis).
[3] Laramie, Wyoming, anorthosite (dry basis).

TABLE II

| Treatment | Temp in °C | Time in min. | $Fe^{3+}$ conc. g/l | Free $H^+$ conc. g/l |
|---|---|---|---|---|
| Conditions | 200 | 30 | 13.7 | 0.008 |

| Conversion to $Fe_2O_3$ in % | $Fe(NO_3)_3$ | $Fe_2(SO_4)_3$ | $FeCl_3$ |
|---|---|---|---|
| | 98.4 | 76.8 | 52.6 |

What is claimed is:

1. A process for removing dissolved iron salts from aqueous, acidic stripping solutions which result from the stripping of organic, iron-laden extractants with an aqueous acid solution comprising subjecting the aqueous acidic stripping solution containing a dissolved iron salt selected from the group consisting essentially of ferric sulfate ($Fe_2(SO_4)_3$) and ferric chloride ($FeCl_3$) to a hydrothermal treatment at a temperature in excess of about 100° C in the presence of an aluminous compound of the formula $Al_2O_3.xH_2O$, where $x$ is 0.01 to 3.0, the compound being added in an amount within the range of about 20% of the stoichiometric to about the stoichiometric quantity capable of being dissolved by the total free and liberated acid content of the acidic stripping solution being treated for a time sufficient to dissolve said aluminous compound and to convert at least about 50% of the dissolved iron salt to the acid insoluble solid $Fe_2O_3$ form, followed by separation of the solid $Fe_2O_3$ and recovery of an acidic solution depleted in dissolved iron content.

2. Process of claim 1, wherein the aluminous compound is added in an amount in excess of the quantity capable of being dissolved by the total acid content of the acidic stripping solution.

3. Process of claim 1, wherein the dissolved iron salt is ferric sulfate.

4. Process of claim 1, wherein the dissolved iron salt is ferric chloride.

5. Process of claim 1, wherein the hydrothermal treatment is accomplished within the temperature range of about 150° and about 250° C.

* * * * *